(12) United States Patent
Lee

(10) Patent No.: US 6,302,594 B1
(45) Date of Patent: Oct. 16, 2001

(54) OPTICAL FIBER CONNECTIONS

(75) Inventor: Hsin Lee, Issaquah, WA (US)

(73) Assignee: Fiberon Technologies, Inc., Issaquah, WA (US)

( * ) Notice: Subject to any disclaimer, the term of this patent is extended or adjusted under 35 U.S.C. 154(b) by 0 days.

(21) Appl. No.: 09/358,617

(22) Filed: Jul. 21, 1999

(51) Int. Cl.[7] ....................................................... G02B 6/36
(52) U.S. Cl. ................................ 385/87; 385/86; 385/76; 385/53
(58) Field of Search ................................. 385/87, 86, 76, 385/53, 66, 68, 80, 81, 84

(56) References Cited

U.S. PATENT DOCUMENTS 6,178,283 * 1/2001 Weigel ................................ 385/87 X

* cited by examiner

Primary Examiner—Phan T. H. Palmer
(74) Attorney, Agent, or Firm—Delbert J. Barnard

(57) ABSTRACT

A buffering sleeve (46) is slid onto an outer end portion of an optical fiber cable (12) that includes an optical fiber surrounded by a buffer covering (16). The buffering sleeve (46) is crimped onto the buffer covering (16). A bared length of optical fiber (14) extends endwise outwardly from the buffering sleeve (46), into and through a center opening (40) in a ferrule (38) that is at the outer end of a connector fitting (10). Connector fitting (10) includes an inwardly opening inner socket (34) that snugly receives the buffer sleeve (46). The inner end portion of the inner socket (34) is crimped onto an inner end portion (52) of the buffering sleeve (46). The bared optical fiber (14) projects forwardly through center opening (40) in ferrule (38). Outwardly of the ferrule (38), the optical fiber (14) is cleaved and polished, flush with the outer end (39) of the ferrule (38).

11 Claims, 3 Drawing Sheets

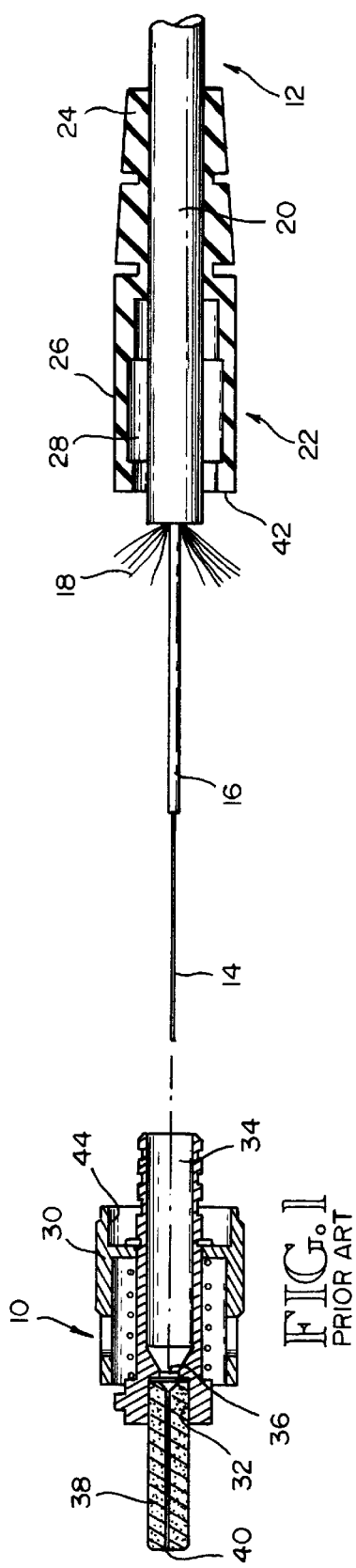
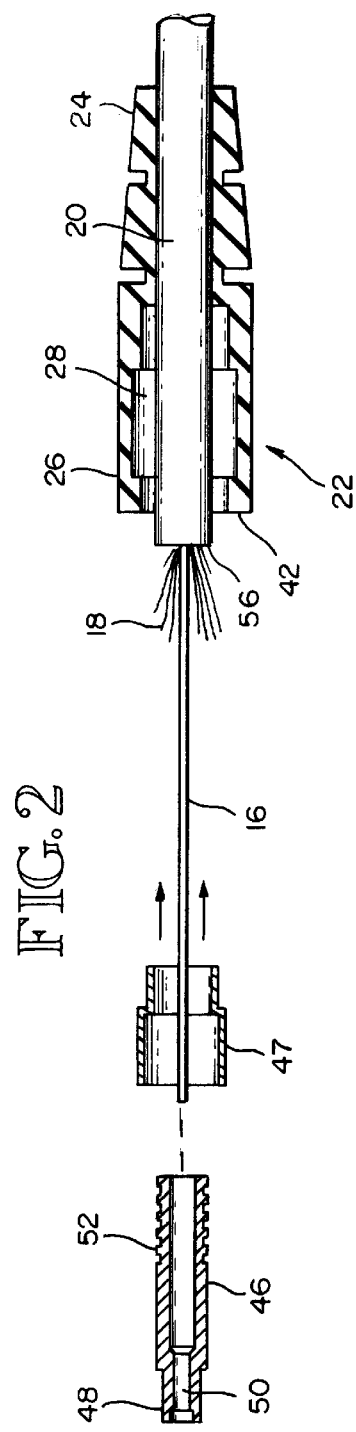

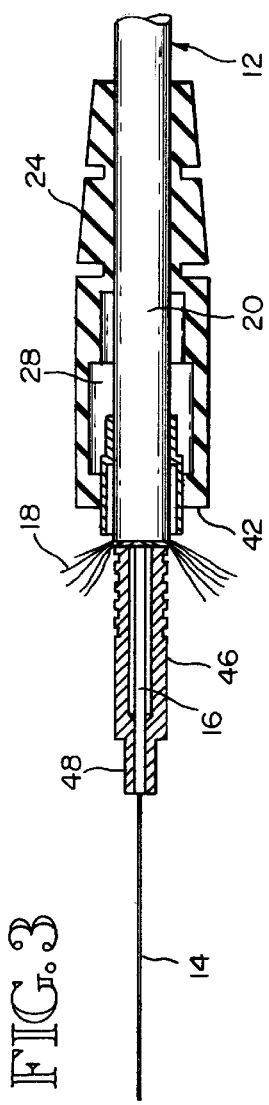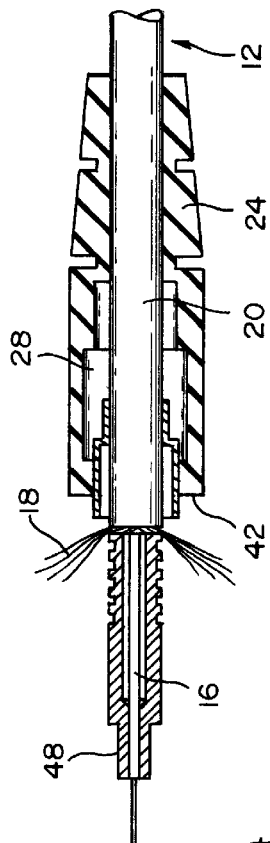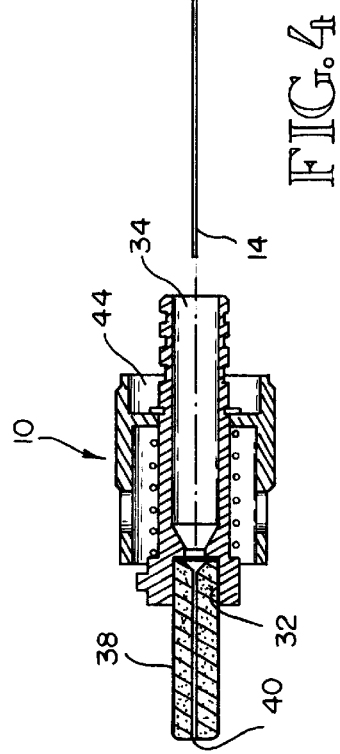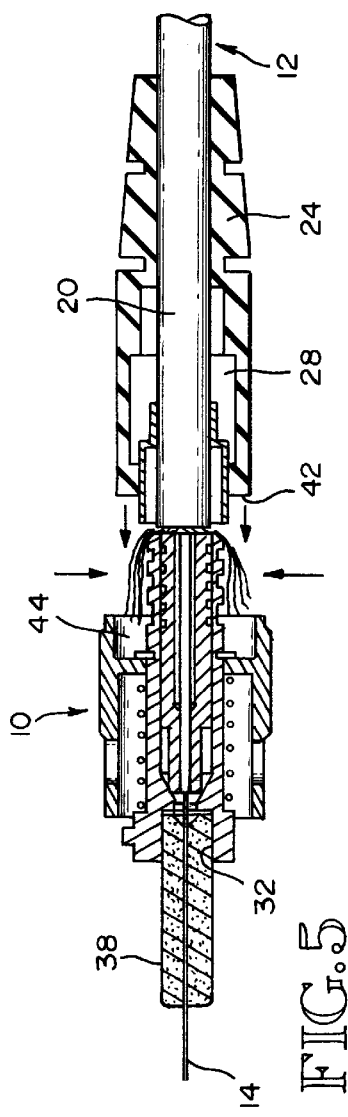

OPTICAL FIBER CONNECTIONS

TECHNICAL FIELD

The present invention relates to optical fiber technology. More particularly, it relates to the provision of a connector fitting that is adapted to be mechanically attached to the end of an optical fiber cable.

BACKGROUND OF THE INVENTION

Optical fibers are used extensively in state-of-the-art systems for transmitting information rapidly from one location to another. In these systems, the optical fibers are at their ends connected to other optical fibers or to optical devices. To ensure quality transmission of the information, it is necessary to construct the connections in a way that will minimize connection losses. According to conventional practice, end portions of two optical fiber cables are connected together with confronting ends of their optical fibers aligned and in contact with each other. An end portion of an optical fiber cable is connected to an optical device with its optical fiber in contact with an optical surface on the optical device. Connection fittings are provided at the cable ends to facilitate making the connections.

It is known to use a connector fitting that includes a ferrule having a small diameter center opening through which a bared length of optical fiber extends. The bared optical fiber and a portion of the cable axially inwardly of it are connected to the connector fitting by use of an epoxy glue. The epoxy glue is placed into a tubular inner end socket portion of the fitting. Then, the bared end portion of the optical fiber is inserted into the inner end of the fitting and moved outwardly through the epoxy glue into and through the center opening in the ferrule. After the epoxy glue has set, the bared optical fiber is cleaved flush with the outer end of the ferrule and the cut end is polished.

In the conventional way of connecting the optical fiber cable to the connector fitting, the epoxy glue that is used requires a long period of time to cure. In order to shorten the curing time, a heat gun is sometimes used but its use requires that there be a power source present to operate the heat gun. Sometimes the bared optical fiber is not properly inserted into the tubular rear portion of the connector fitting. This makes it necessary to remove the epoxy and start over in the making of the connection. There is a waste of epoxy glue and it is hard to cut and polish the optical fiber when there is epoxy on the ferrule.

A principal object of the present invention is to provide a mechanical connection of the optical fiber cable to the connector fitting, that is adapted to provide stability to the cutting of the optical cable. It is another object of the present invention to provide a connection fitting for the end of the fiber optical cable that can be installed either with or without using epoxy glue.

BRIEF SUMMARY OF THE INVENTION

The present invention is basically characterized by the use of an elongated tubular buffering sleeve between a connector fitting and an end portion of an optical fiber cable. The optical fiber cable includes an optical fiber that is surrounded by an annular buffer and an annular outer jacket. The cable is trimmed back at its end to provide a length of bared optical fiber extending axially outwardly from a length of optical fiber and buffer. The connector fitting comprises a tubular ferrule having a center opening and a tubular socket extending axially inwardly of the fitting from the ferrule. The trimmed back end of the optical fiber cable is inserted into the tubular buffering sleeve through an inner end opening. It is then moved outwardly to place the length of optical fiber and buffer inside the buffering sleeve and cause the bared length of optical fiber to project outwardly forwardly of the buffering sleeve. Then, the outer end portion of the buffering sleeve is crimped onto the length of optical fiber and buffer that is inside the buffering sleeve. Next, the bared optical fiber is inserted into the tubular socket at the inner end of the connector fitting and is moved outwardly into and through the center opening in the ferrule. The optical fiber cable and buffering sleeve are moved outwardly until the buffering sleeve is within the socket at the inner end of the connector fitting. Then, the inner end portion of the socket is crimped onto the inner end portion of the buffering sleeve.

The buffering sleeve supports the bared length of optical fiber so that it is not in a floating state when it is cut. This cutting occurs after the end portion of the cable and the buffering sleeve have been inserted into the tubular inner end portion of the connector fitting. When these parts are together, and the inner end portion of the fitting has been crimped onto the inner end portion of the buffering sleeve, an outer end portion of the bared optical fiber projects axially outwardly from the ferrule. The projecting portion of the bared fiber is cleaved and its cut end is polished.

According to an aspect of the invention, the tubular buffering sleeve includes an interior diameter in its outer end portion that is sized such that when the outer end portion of the buffering sleeve is crimped, it firmly grips the length of optical fiber and buffer that is in it.

According to another aspect of the invention, the fitting includes an outer sidewall portion that surrounds the buffering sleeve and with it forms an annular socket opening. The fiber optical cable includes an annular boot having an outer end portion. The annular boot is moved on the cable to move the outer end portion of the boot into the annular socket in the fitting.

The use of the buffering sleeve between the end of the fiber optical cable and the connector fitting makes it possible to mechanically connect the fitting to the fiber optical cable in such a way that enhances the stability of fiber slicing and otherwise facilitates the assembly operation.

Other objects, advantages and features of the invention will become apparent from the description of the best mode set forth below, from the drawings, from the claims and from the principles that are embodied in the specific structures that are illustrated and described.

BRIEF DESCRIPTION OF THE SEVERAL VIEWS OF THE DRAWING

In the drawings, like reference numerals and letters refer to like parts throughout the several views and:

FIG. 1 is an exploded longitudinal sectional view of an end portion of an optical fiber cable and a prior art connector fitting, such view showing the cable parts in side elevation;

FIG. 2 is a view like FIG. 1 but minus the connector fitting and showing a buffering sleeve, the provision of which constitutes an aspect of the present invention;

FIG. 3 is a longitudinal sectional view of the end portion of the cable, showing parts of the cable in side elevation and showing a length of optical fiber and a surrounding annular buffer positioned in the buffering sleeve, and further showing a length of bared optical fiber extending axially outwardly of the length of optical fiber and buffer;

FIG. 4 is a view like FIG. 1, but including the buffering sleeve of the present invention;

FIG. 5 is an assembled view of the components of FIG. 4; and

DETAILED DESCRIPTION OF THE INVENTION

Figure 6:
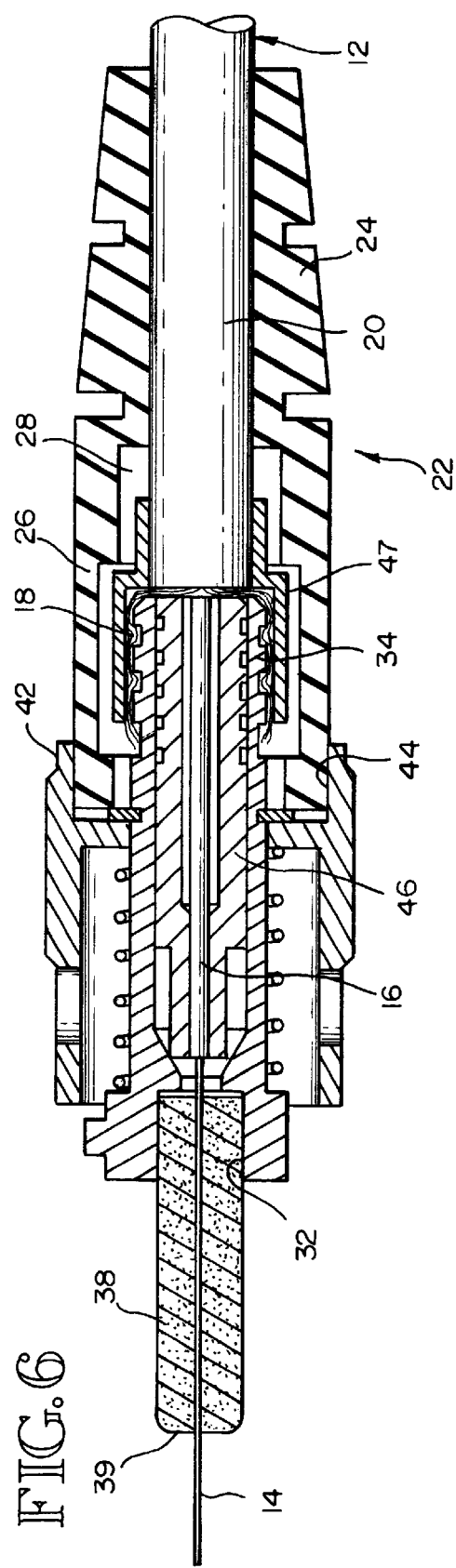
FIG. 6 is a view similar to FIG. 5, but showing the optical fiber flush at its outer end with the outer end of a ferrule and showing the boot moved outwardly into engagement with the connector fitting.

FIG. 1 shows a prior art end fitting 10 for a fiber optical cable 12. It further shows a trimmed back end portion of the cable 12, comprising a length 14 of bared optical cable at the very end and a length 16 of optical cable and annular buffer immediately inwardly of the bard cable. The annular buffer 16 is made to cover the optical fiber 14 the full length of the cable 12. The annular buffer 16 is surrounded by Kevlar fibers 18 which are in turn surrounded by an outer jacket 20. A boot 22 surrounds the outer jacket 20 at the end of the cable 12. Boot 22 is of conventional construction and includes an inner end portion 24 that snugly surrounds the outer jacket 20 and an annular outer end portion 26 that surrounds the outer jacket 20 in a spaced relationship. An annular space 28 is formed by and between outer end portion 26 of the boot 22 and the outer end portion of jacket 20.

The connector fitting 10 shown by FIG. 1 is a prior art fitting. It is made of metal and comprises a main body 30 having an outer end socket 32 and an inner end socket 34. The sockets 32, 34 have a common base that includes a center opening 36. The inner end portion of an elongated tubular ferrule 38 is received in the outer socket 32. Ferrule 38 projects outwardly from the socket 32 and includes a small diameter center opening 40. The length of bared optical fiber 14 extends through and is received in the opening 40.

As described above, the conventional practice is to apply epoxy into the socket opening of the inner socket 34. Then, the optical fiber cable, bared end portion first, is moved into and through the socket 34. The optical fiber 14 receives a coating of the epoxy glue as it moves through the epoxy glue in the inner socket 34. The bared optical fiber 14 moves into and through the center opening 40 until the length 16 of optical fiber and buffer is inside the inner socket 34. When the epoxy glue has set, the projecting end portion of the optical fiber 14 is cleaved and is polished to make is flush with the outer end of the ferrule 38. The jacket 24 is slid outwardly on the outer jacket 20 of cable 12, to place its annular outer end portion 42 inside of annular chamber 44 formed at the inner end of connector fitting 10.

FIGS. 2–6 show a buffering sleeve 46 that is tubular and is preferably made out of the same metal (or same other material) as connector fitting 10. Buffer sleeve 42 has an outer end portion 48 that includes a center opening 50 sized to snugly receive the optical fiber and buffer cover 16. As shown by FIGS. 5 and 6, the buffering sleeve 46 is of such a length that it is located substantially wholly within the inner socket 34. The outer diameter of buffering sleeve 46 is of such a diameter that the buffering sleeve 46 makes a rather snug fit in the inner socket 34. The outer surface 52 of the inner end portion of buffer sleeve 46 may be formed to include girth grooves separated by girth rings. In other words, the outer portion of the inner end portion 52 may be a corrugated surface.

Referring to FIG. 3, according to the invention, the outer end portion of the cable 12 is trimmed back to form an outer end length of bared optical fiber 14 that is immediately axially outwardly of a length of optical fiber and buffer 16.

Referring to FIG. 2, the buffer covered fiber 16 is inserted into buffering sleeve through its inner end. The length 16 is moved forwardly until the inner end of inner socket 34 is against the outer end 56 of jacket 20. Then the projecting portion of length 16 is trimmed back to bare fiber 16. See FIGS. 3–5. Or, the length 16 is trimmed back first. Then the bared optical fiber 14 is inserted into and through the buffering sleeve 46, from its inner end, and is moved endwise outwardly until the bared optical fiber 14 is positioned outwardly of the buffering sleeve 46 and the end surface 54 of the buffering sleeve 46 is adjacent the outer end surface 56 of the outer jacket 20. Kevlar™ fibers 18 that are in the cable 12 between the buffer layer 16 and the cable jacket 20 are put into the position shown by FIG. 2. Then, a squeezing pressure is applied to the outer end portion 48 of the buffering sleeve 46. By way of non-limitive example, a 0.068" hex crimp tool may be used. The crimping secures the outer end portion 48 onto the buffer covered portion 16 of the optical fiber that is within end portion 48. The crimping mechanically secures the buffering sleeve 46 to the buffer layer of length 16. Preferably, a two diameter crimp sleeve 47 is provided.

Following securement of the buffering sleeve to the optical fiber and buffer cover, the bared optical fiber 14 is moved into and through the connector fitting 10, from the inner end of the inner socket 34. The end portion of the cable is moved until the bared optical fiber 14 is in the center opening 40 of the ferrule 38 (FIG. 5) and the buffering sleeve 46 is within the inner socket 34. Then, the Kevlar™ is spread around the inner socket 34. Next, the sleeve 47 is moved to place its large diameter end over the Kevlar™. Then, radially inward squeezing pressure is applied to the large diameter end portion of the sleeve 44, so as to crimp it onto the corrugated surface at the inner end of the buffering sleeve 46. By way of non-limitive example, a 0.178" hex die may be used to crimp over the inner socket 34. Then, a 0.151 hex die is used to crimp the small diameter end portion of sleeve 47 on the buffer layer. This crimping mechanically secures the connector fitting 10 to the buffering sleeve 46 that was previously mechanically secured to the buffer covered portion of the optical fiber that is inside it.

After the connector fitting 10 has been crimped to the buffering sleeve, the boot 22 is slid outwardly into the position show by FIG. 6. In this position, the annular outer end portion 42 of the boot 22 is positioned within the annular socket 44 formed at the end of connector fitting 10. Sleeve 47 is positioned within chamber 28.

Also, the projecting end portion of an optical fiber 14 is cleaved substantially at the outer end 39 of the ferrule 38. The cut end of the optical fiber 14 is then polished in the manner previously described.

As best shown by FIG. 6, the buffering sleeve 46 is snugly received in, and is secured to, the inner socket 34 of the connector fitting 10 and an outer end portion of buffer covered optical fiber 16 is snugly received in, and is secured to, the outer end portion of buffering sleeve 46. This arrangement provides a very secure mechanical connection between the connector fitting 10 and the end portion of the fiber optical cable 12. As previously stated, the mechanical connections alone will provide a secure and stable connection. However, if it is desired, some epoxy can be used with this connection. The epoxy can be placed in the center opening 40 in the ferrule 38. It can be placed inside of the inner socket 32, and in particular in the annular chamber 58 that is formed between the outer end of buffering sleeve 46 and the base of inner socket 34.

The illustrated embodiments are only examples of the present invention and, therefore, are non-limitive. It is to be understood that many changes in the particular structure, materials and features of the invention may be made without departing from the spirit and scope of the invention. For example, the second sleeve (herein "crimping sleeve") is optional. If used, this crimp sleeve 47 is slid over the Kevlar™ fibers that have been spread around the inner end of the buffering sleeve 46. The crimping sleeve is then crimped onto sleeve 46 and the Kevlar™ that surrounds sleeve 46. If sleeve 47 is not used, the Kevlar™ is either not attached or is glued to the socket 34. Therefore, it is my intention that my patent rights not be limited by the particular embodiments illustrated and described herein, but rather determined by the following claims, interpreted according to accepted doctrines of claim interpretation, including use of the doctrine of equivalents and reversal of parts.

What is claimed is:

1. An optical fiber connection, comprising:

an elongated tubular buffering sleeve having inner and outer end portions;

an optical fiber cable that includes an optical fiber surrounded by an annular buffer and an annular outer jacket, said cable being trimmed back at its end to provide a length of bared optical fiber extending axially outwardly from a length of optical fiber and buffer;

a connector fitting comprising a tubular ferrule having a center opening and a tubular socket extending axially inwardly of said fitting from said ferrule;

said length of optical fiber and buffer being positioned within said buffering sleeve and said length of bared optical fiber extending axially outwardly from the buffering sleeve into the center opening of the ferrule;

said outer end portion of said buffering sleeve being crimped onto the length of optical fiber and buffer that is inside it; and said buffering sleeve being positioned within said socket and said socket including an inner end portion that is crimped onto the inner end portion of the buffering sleeve.

2. The optical fiber connection of claim 1, wherein the tubular buffering sleeve includes a first interior diameter in its outer end portion and a second, larger internal diameter axially inwardly of the outer end portion of the buffering sleeve, wherein the first internal diameter is sized such that when the outer end portion of the buffering sleeve is crimped it will firmly grip the bared optical fiber and buffer.

3. The optical fiber connection of claim 2, wherein the tubular socket extends axially inwardly of the fitting and the fitting includes an outer sidewall portion that surrounds the buffering sleeve and with it forms an annular socket opening, and said combination further includes an annular boot on the optical fiber cable having an outer end portion that fits within the annular socket opening.

4. The optical fiber connection of claim 3, wherein the bared optical fiber includes a cleaved outer end that is substantially flush with the outer end of the ferrule.

5. The optical fiber connection of claim 4, wherein the connector fitting includes an axially outwardly opening outer end socket and the ferrule includes an inner end portion that is within the outer end socket.

6. The optical fiber connection claim 2, wherein the tubular socket extends axially inwardly of the fitting and the fitting includes an outer sidewall portion that surrounds the buffering sleeve and with it forms an annular socket opening, and said combination further includes an annular boot on the optical fiber cable having an outer end portion that fits within the annular socket opening.

7. The optical fiber connection of claim 6, wherein the bared optical fiber includes a cleaved outer end that is substantially flush with the outer end of the ferrule.

8. The optical fiber connection of claim 1, wherein the connector fitting includes an axially outwardly opening outer end socket and the ferrule includes an inner end portion that is within the outer end socket.

9. The optical fiber connection of claim 1, wherein the bared optical fiber includes a cleaved outer end that is substantially flush with the outer end of the ferrule.

10. The optical fiber connection of claim 9, wherein the connector fitting includes an axially outwardly opening outer end socket and the ferrule includes an inner end portion that is within the outer end socket.

11. The optical fiber connection of claim 1, wherein the connector fitting includes an axially outwardly opening outer end socket and the ferrule includes an inner end portion that is within the outer end socket.

* * * * *